Oct. 25, 1932.   R. C. ROATH   1,884,249
CONTINUOUS LEDGER ACCOUNT AND STATEMENT FILE
Filed Feb. 24, 1931   3 Sheets-Sheet 2
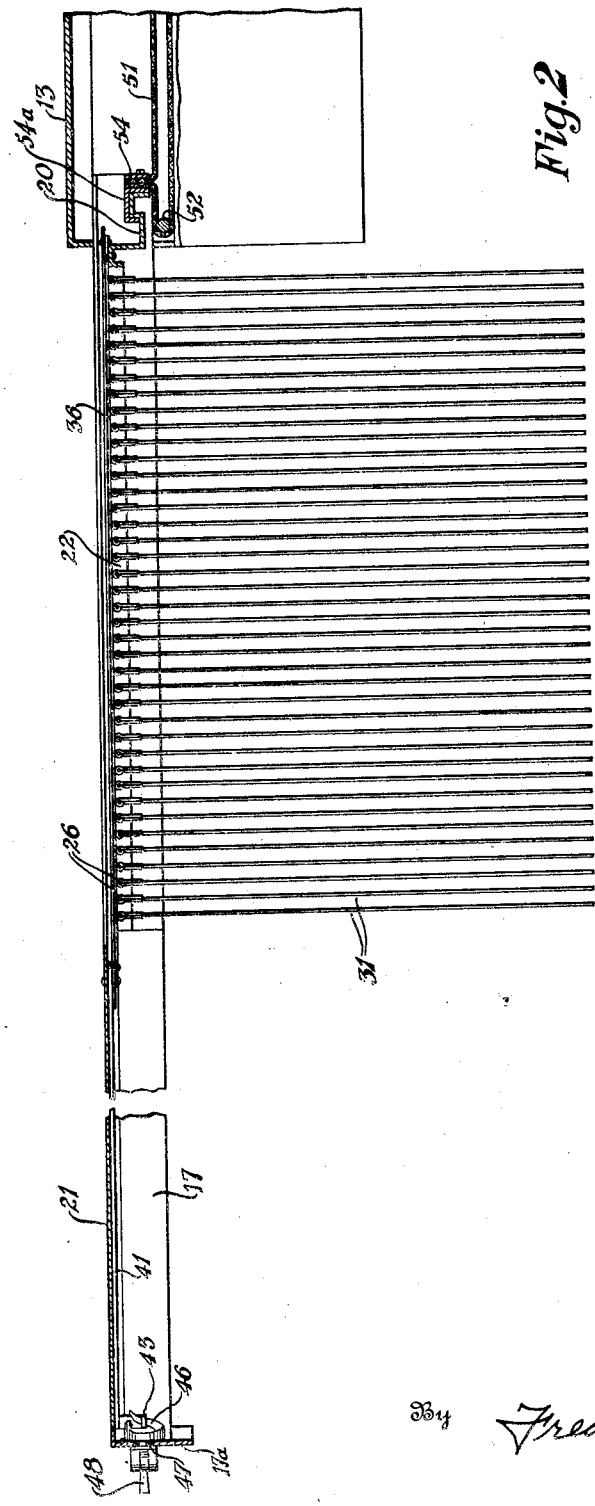
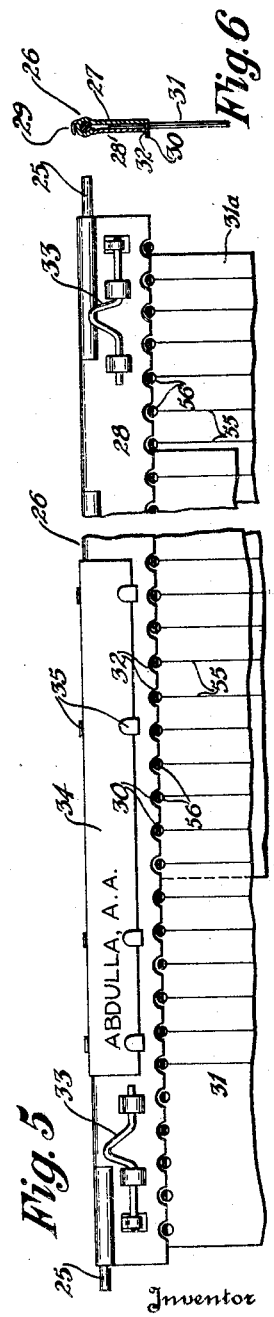
Inventor
R. C. Roath
By Frease and Bishop
Attorneys Oct. 25, 1932.    R. C. ROATH    1,884,249
CONTINUOUS LEDGER ACCOUNT AND STATEMENT FILE
Filed Feb. 24, 1931    3 Sheets-Sheet 3
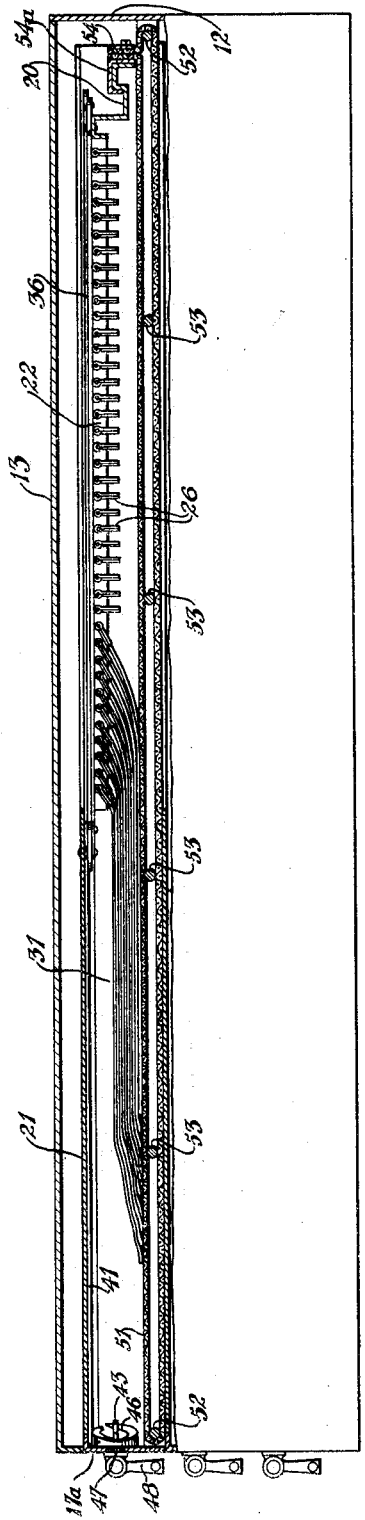
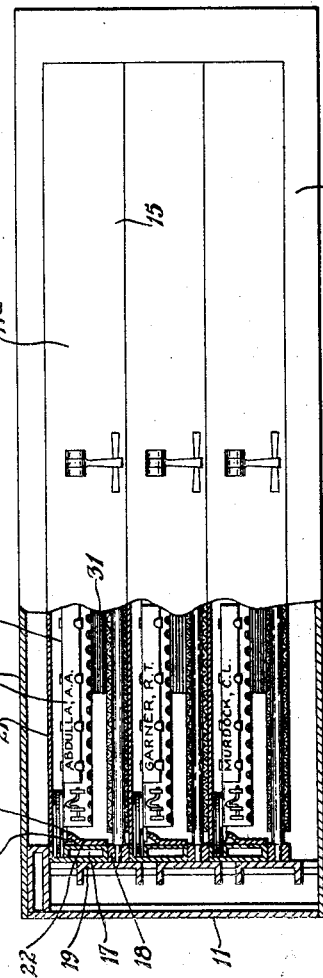
Inventor
R. C. Roath
By Frease and Bishop
Attorneys Patented Oct. 25, 1932

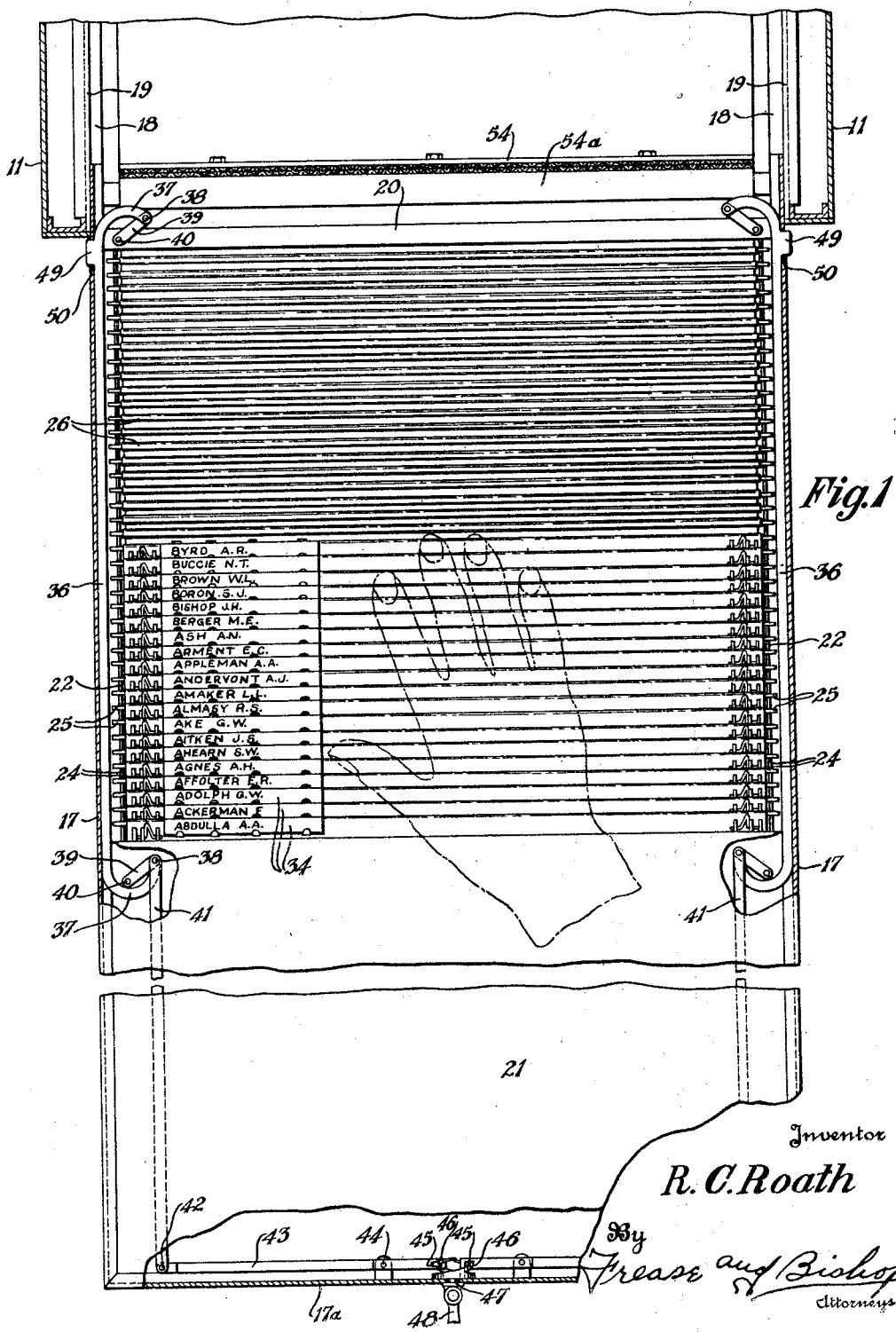

1,884,249

UNITED STATES PATENT OFFICE

ROBERT C. ROATH, OF ALLIANCE, OHIO, ASSIGNOR TO THE McCASKEY REGISTER COMPANY, OF ALLIANCE, OHIO, A CORPORATION OF OHIO

CONTINUOUS LEDGER ACCOUNT AND STATEMENT FILE

Application filed February 24, 1931. Serial No. 517,911.

The invention relates to a filing device for filing the leaves or pages of a continuous ledger account and if desired, a monthly statement page or sheet for each ledger account.

The object of the improvement is to provide a filing device in which these ledger leaves and statements may be filed in compact form and in which they are readily accessible for use.

A further object is to provide a filing drawer for receiving the ledger leaves and statements so arranged that when the drawer is opened the leaves will hang vertically therein, means being provided for storing the leaves in substantially horizontal position when the drawer is closed.

Another object is to provide an improved clamp for each ledger leaf and corresponding statement sheet, said clamp being adapted to be inserted into the billing and posting machine disclosed in my application Serial No. 507,118, filed January 7, 1931.

A still further object is the provision of a conveyer belt connected to the drawer of the filing cabinet and arranged to support the ledger leaves and statements in horizontal position within the cabinet when the drawer is closed and to guide the leaves out of the cabinet as the drawer is opened.

A still further object of the improvement is to provide a locking device for the clamps so arranged that the drawer cannot be closed until the clamps have been properly locked in position therein.

Another object is to provide means for entirely removing the drawer frame from the cabinet so that, with the leaves therein, it can be handled as a ledger. The leaves may then be removed from the clamps, without removing the clamps from the drawer frame.

A still further object is to provide means for alining the ledger sheet and statement sheet, in the clamp, in any desired relative position.

Another object is to provide lined ledger sheets and statement sheets with uniformly spaced perforations corresponding to the line spacing on the sheets.

The above and other objects which will be obvious from an inspection of the accompanying drawings and the following detail description, or which will be later pointed out, may be attained by constructing the invention in the manner illustrated in the drawings, in which Figure 1 is a plan sectional view of a drawer of the cabinet showing the same in the open position and illustrating the manner of exposing the identifying labels upon the clamps;

Fig. 2, a vertical sectional view of the front portion of the cabinet showing one drawer in open position;

Fig. 3, a vertical sectional view through the cabinet showing a drawer in closed position;

Fig. 4, a front elevation of the cabinet with the drawers in closed position, parts being broken in section;

Fig. 5, an elevation of one of the clamps; and

Fig. 6, a transverse sectional view through the same.

Similar numerals refer to similar parts throughout the drawings.

The improved filing cabinet to which the invention pertains includes generally a casing which may be made of sheet metal or other suitable material, comprising a bottom wall 10, side walls 11, a rear wall 12 and a top 13.

The front portion of the cabinet is provided with the rectangular frame shown generally at 14, having the front thereof open as shown at 15 to receive the drawers which will be later described.

Each drawer frame comprises preferably a pair of tubular side frame members 17 slidably mounted upon the bars 18 which are welded or otherwise connected to the inner faces of the channel guide strips 19 extending longitudinally through the cabinet and preferably spaced from the adjacent side walls 11 thereof.

The tubular side frame member 17 of each drawer are connected at their forward ends by a plate 17a, preferably of channel shape, for the purpose of strengthening and reinforcing the structure, and at their rear ends by a double channel bar 20, each drawer thus comprising a substantially rectangular frame.

For the purpose of providing sufficient space to accommodate and protect the sheets in horizontal position within the cabinet when the drawer is closed, as shown in Fig. 3, a table 21, in the form of a plate of sheet-metal or the like, may be connected to the forward portion of the rectangular drawer frame, providing an arm rest when referring to ledger sheets in the drawer.

A strip 22 is attached to the inner side of each side member 17 of the drawer, the upper edge thereof being preferably bent inward from the drawer at an angle, as shown at 23, and notched, as indicated at 24, for the purpose of receiving the pintles 25 at the ends of the clamps indicated generally at 26.

Each clamp comprises the back member 27 and front member 28 which are hinged together along one longitudinal edge, as at 29, the member 27 being provided with spaced angular prongs 30 adapted to be projected through the ledger sheet indicated generally at 31, the front member 28 having notches 32 to receive said prongs.

A suitable locking device 33 which may be of any usual and well known construction may be provided, preferably at each end portion of the clamp, for holding the members 27 and 28 tightly clamped together upon the ledger leaf and preferably also clamping a statement sheet with interleaved carbon.

For the purpose of identifying each ledger sheet when in a drawer of the cabinet, a ticket or label 34 may be connected to the front plate of each clamp as by the label holders or tangs 35.

For the purpose of locking all of the clamps against displacement in the drawer, before the drawer is closed, a pair of longitudinally disposed locking bars 36 is provided, one bar being located along each side of the drawer, and arranged to be moved over the tops of the pintles 25 of the clamps to hold them against accidental displacement from the notches 24.

As shown in Fig. 1, the locking bars 36 are in the unlocked position, permitting access to and removal of any desired clamp. Each of these locking bars is provided at each end with an angular or curved arm 37 extending inward and pivotally connected at its end, as at 38, to the free end of a link 39 fulcrumed as at 40 upon some suitable stationary portion of the drawer.

A link 41 is pivotally connected to the outer end portion of each bar 36, the forward end of each link being pivoted, as at 42, to the outer end of a lever 43 fulcrumed intermediate its ends, as at 44.

Each of these levers is provided at its inner end with a slot 45 through which is slidably located one of the spirals 46 which are fixed upon a shaft 47 journaled through the front plate 17a of the drawer and provided with a knob or handle 48 for rotating the same.

A locking lug 49 is provided upon a rear end portion of each locking bar 36 and adapted to be projected outward through an aperture 50 in the adjacent side wall of the drawer in the position shown in Fig. 1 in order to prevent closing of the drawer when the locking bars are in the unlocked position.

By rotating the spirals 46 counterclockwise, the levers 43 will operate the links 41 to move them forward, swinging the levers 39 upon their pivots to move the locking bars 36 toward each other and over the pintles 25 of the clamps, at the same time withdrawing the lugs 49 inward so that the drawer may be closed.

The names upon the tickets 34 are visible from the front of the drawer and when it is desired to refer to any particular ledger sheet in the drawer it is only necessary to place the hand upon the tops of the clamps in the position shown in Fig. 1 and push the hand rearward, tilting all the clamps upon their pintles into position to more fully display the tickets 34 thereof so that the names may be more easily read.

With the drawer in the open position, it will be seen that all of the ledger leaves will hang vertically, as best shown in Fig. 2, permitting any desired clamp and the leaf carried thereby to be easily removed or replaced in the drawer.

However, when the drawer is closed, in order to conserve space and provide a compact filing system, it is desirable that the ledger leaves be moved into horizontal position within the cabinet.

For the purpose of disposing the leaves in horizontal position when the drawer is closed and in order to keep them in proper position, as well as to carry them outward in proper order as the drawer is opened, an endless belt 51 is provided in the cabinet, beneath each drawer frame, forming the bottom of the drawer when in closed position. This belt is arranged to operate over rollers 52 located at the front and rear ends of the cabinet, and for the purpose of supporting the belt in horizontal position throughout the cabinet, a series of rollers or rods 53 may be located through the same at intervals.

As the drawer frame is moved back into the cabinet, the ledger leaves will be picked up one after the other from the rear toward the front upon the endless belt, which forms the bottom of the drawer in closed position, and moved back thereon in horizontal position into the cabinet, as shown in Fig. 3.

In order to operate the belt with the movement of the drawer, the same may be fixed to the rear end portion of the drawer by any suitable and well known means, preferably as best shown in Figs. 2 and 3, in which the ends of the belt may be clamped between the crossbar 54 and the channel filler 54a or the like, arranged to be fitted upon the double channel bar 20.

By removing the channel filler 54a from engagement with the channel bar 20, it will be seen that the drawer frame is entirely disconnected from the belt and may be removed from the cabinet and used as a ledger. The entire drawer frame may then be inverted and the ledger sheet may be removed from the clamps without removing the clamps from the drawer frame.

In the cabinet as actually built, all of the ledger leaves in a drawer will be easily accommodated upon the belt when the drawer is closed, but owing to the exaggerated thickness of the ledger leaves shown in Fig. 3, only a small number of the ledger leaves have been indicated, the clamps in the rear portion of the drawer being shown without ledger leaves clamped therein.

Each of the ledger sheets 31 and statement sheets 31a is provided with uniformly spaced horizontal lines 55, and with apertures 56, at one edge, spaced corresponding to the spacing of said lines, and arranged to be engaged by the prongs 30 upon the clamp. In the operation of the ledger it will be understood that at the end of the month, or other period of time, the statement sheets are all removed from the clamps and sent to the customers, while the ledger leaves remain in the device until all of the lines 55 thereon have been filled up. New statement sheets are placed in the clamps at this time and it will be seen that the top line of each statement sheet must be positioned to register with the line on the ledger sheet below the last line thereof which has been previously filled out. This uniform spacing of the lines and apertures upon the sheets thus makes it possible to provide any desired relative positioning of the two sheets in each clamp.

I claim:

1. A filing device including a cabinet, a drawer frame slidably mounted in the cabinet, means for suspending a plurality of ledger leaves and the like in the drawer frame so that the leaves will hang in vertical position when the drawer is in open position, and means within the cabinet for moving the leaves into horizontal position when the drawer frame is closed.

2. A filing device including a cabinet, a drawer frame slidably mounted in the cabinet, means for suspending a plurality of ledger leaves and the like in the drawer frame so that the leaves will hang in vertical position when the drawer is in open position, and movable means within the cabinet for moving the leaves into horizontal position when the drawer frame is closed.

3. A filing device including a cabinet, a drawer frame slidably mounted in the cabinet, means for suspending a plurality of ledger leaves and the like in the drawer frame so that the leaves will hang in vertical position when the drawer is in open position, and an endless belt within the cabinet for moving the leaves into horizontal position when the drawer frame is closed.

4. A filing device including a cabinet, a drawer frame slidably mounted in the cabinet, removable means for suspending a plurality of ledger leaves and the like in the drawer frame so that the leaves will hang in vertical position when the drawer is in open position, and means within the cabinet for moving the leaves into horizontal position when the drawer frame is closed.

5. A filing device including a cabinet, a drawer frame slidably mounted in the cabinet, removable means for suspending a plurality of ledger leaves and the like in the drawer frame so that the leaves will hang in vertical position when the drawer is in open position, and movable means within the cabinet for moving the leaves into horizontal position when the drawer frame is closed.

6. A filing device including a cabinet, a drawer frame slidably mounted in the cabinet, removable means for suspending a plurality of ledger leaves and the like in the drawer frame so that the leaves will hang in vertical position when the drawer is in open position and an endless belt within the cabinet for moving the leaves into horizontal position when the drawer frame is closed.

7. A filing device including a cabinet, a drawer frame slidably mounted in the cabinet, means for suspending a plurality of ledger leaves and the like in the drawer frame so that the leaves will hang in vertical position when the drawer is in open position, means within the cabinet for moving the leaves into horizontal position when the drawer frame is closed, and means for locking the ledger leaves in the drawer frame.

8. A filing device including a cabinet, a drawer frame slidably mounted in the cabinet, means for suspending a plurality of ledger leaves and the like in the drawer frame so that the leaves will hang in vertical position when the drawer is in open position, means within the cabinet for moving the leaves into horizontal position when the drawer frame is closed, means for locking the ledger leaves in the drawer frame, and means for preventing closing of the drawer frame until the locking means has been operated.

9. A filing device including a cabinet, a drawer frame slidably mounted in the cabinet and having spaced notches on each side, a series of ledger leaf clamps having pintles for engagement in said notches, means for locking said pintles in the notches and means for preventing closing of the drawer frame until the locking means has been operated.

10. A filing device including a cabinet, a drawer frame slidably mounted in the cabinet and having spaced notches on each side, a series of ledger leaf clamps having pintles for engagement in said notches, and locking bars for locking the pintles in said notches.

11. A filing device including a cabinet, a drawer frame slidably mounted in the cabinet and having spaced notches on each side, a series of ledger leaf clamps having pintles for engagement in said notches, locking bars for locking the pintles in said notches, and means upon the locking bars for preventing closing of the drawer frame until the locking bars have been moved to locked position.

12. A filing device including a cabinet, a drawer frame slidably mounted in the cabinet and having spaced notches on each side, a series of ledger leaf clamps having pintles for engagement in said notches, and label holders upon the front sides of said clamps whereby the clamps may be rotated upon the pintles to display the labels held by said holders.

13. A filing device including a cabinet, a drawer frame slidably mounted in the cabinet, means for suspending a plurality of ledger leaves and the like in the drawer frame so that the leaves will hang in vertical position when the drawer frame is in open position, an endless belt within the cabinet for moving the leaves into horizontal position when the drawer frame is closed, and means for detachably connecting the endless belt to the drawer frame so that the drawer frame may be entirely removed from the cabinet.

In testimony that I claim the above, I have hereunto subscribed my name.

ROBERT C. ROATH.